(12) United States Patent
Nakagawa

(10) Patent No.: US 10,800,349 B2
(45) Date of Patent: Oct. 13, 2020

(54) AUTOMOBILE INTERIOR TRIM

(71) Applicant: KASAI KOGYO CO., LTD., Kanagawa (JP)

(72) Inventor: Hiromichi Nakagawa, Hadano (JP)

(73) Assignee: KASAI KOGYO CO., LTD., Koza-Gun, Kanagawa (JP)

( * ) Notice: Subject to any disclaimer, the term of this patent is extended or adjusted under 35 U.S.C. 154(b) by 204 days.

(21) Appl. No.: 16/309,600

(22) PCT Filed: Sep. 5, 2016

(86) PCT No.: PCT/JP2016/075950
§ 371 (c)(1),
(2) Date: Dec. 13, 2018

(87) PCT Pub. No.: WO2018/042645
PCT Pub. Date: Mar. 8, 2018

(65) Prior Publication Data
US 2019/0176718 A1 Jun. 13, 2019

(51) Int. Cl.
*B60R 13/02* (2006.01)
*B29C 65/40* (2006.01)
(Continued)

(52) U.S. Cl.
CPC ............ *B60R 13/02* (2013.01); *B29C 65/405* (2013.01); *B23K 26/38* (2013.01); *B23K 2103/42* (2018.08);
(Continued)

(58) Field of Classification Search
CPC ............... B60R 13/02; B29L 2031/302; B29L 2031/3041
(Continued)

(56) References Cited

U.S. PATENT DOCUMENTS

2004/0043683 A1* 3/2004 Muench ............ B29C 45/14795
442/43
2005/0041893 A1* 2/2005 Hartmann ............... B29C 66/45
383/107

(Continued)

FOREIGN PATENT DOCUMENTS

JP  H09-286235 A  11/1997
JP  3184807 U  7/2013
(Continued)

OTHER PUBLICATIONS

International Search Report for International Application No. PCT/JP2016/075950 dated Oct. 11, 2016, Japan.

*Primary Examiner* — Jason S Morrow
*Assistant Examiner* — E Turner Hicks
(74) *Attorney, Agent, or Firm* — United IP Counselors, LLC

(57) ABSTRACT

An automobile interior trim has a resin core material and a skin material that is joined on a surface of the resin core material. The automobile interior trim has stitches that are formed on the skin material by sewing the skin material with threads. The skin material and the stitches are cut by a laser beam to generate a cut section. The vicinity of the cut section has a structure in which threads of the stitches and the raw material of the skin material are melted by heat of the laser beam, mixed together, and solidified.

17 Claims, 3 Drawing Sheets

(51) Int. Cl.
  B23K 103/00   (2006.01)
  B32B 7/09    (2019.01)
  B23K 26/38   (2014.01)
  B29K 23/00   (2006.01)
  B29K 67/00   (2006.01)
  B29K 77/00   (2006.01)
  B29K 267/00  (2006.01)
  B29K 309/08  (2006.01)
  B29L 31/30   (2006.01)
  B32B 3/18    (2006.01)
  B32B 7/12    (2006.01)
  B32B 27/08   (2006.01)
  B32B 27/30   (2006.01)
  B32B 27/32   (2006.01)
  B32B 27/34   (2006.01)
  B32B 27/36   (2006.01)
  B32B 37/16   (2006.01)
  B32B 38/00   (2006.01)

(52) U.S. Cl.
  CPC ...... *B29K 2023/06* (2013.01); *B29K 2023/12* (2013.01); *B29K 2067/003* (2013.01); *B29K 2077/00* (2013.01); *B29K 2267/003* (2013.01); *B29K 2309/08* (2013.01); *B29L 2031/302* (2013.01); *B29L 2031/3041* (2013.01); *B32B 3/18* (2013.01); *B32B 7/09* (2019.01); *B32B 7/12* (2013.01); *B32B 27/08* (2013.01); *B32B 27/304* (2013.01); *B32B 27/32* (2013.01); *B32B 27/34* (2013.01); *B32B 27/36* (2013.01); *B32B 37/16* (2013.01); *B32B 38/0004* (2013.01); *B32B 2038/008* (2013.01); *B32B 2305/188* (2013.01)

(58) Field of Classification Search
  USPC .......................... 296/1.08, 146.7, 39.1, 39.3
  See application file for complete search history.

(56) References Cited

U.S. PATENT DOCUMENTS

| | | | |
|---|---|---|---|
| 2006/0024476 A1* | 2/2006 | Leland | B44C 1/228 428/137 |
| 2007/0131337 A1* | 6/2007 | Guilhem | D05B 17/00 156/93 |
| 2012/0055627 A1* | 3/2012 | Kuntz | B29C 66/72141 156/256 |
| 2016/0121837 A1* | 5/2016 | Mazur | B29C 44/06 280/728.3 |
| 2016/0144562 A1* | 5/2016 | Twork | B29C 45/1704 264/504 |

FOREIGN PATENT DOCUMENTS

| | | |
|---|---|---|
| JP | 2016-5949 A | 1/2016 |
| JP | 2016-107741 A | 6/2016 |

\* cited by examiner

AUTOMOBILE INTERIOR TRIM

CROSS-REFERENCE TO RELATED APPLICATIONS

This application is a National Stage Entry application of PCT International Application No. PCT/JP2016/075950, filed on Sep. 5, 2016, the entire contents of which are hereby incorporated by reference.

BACKGROUND

1. Technical Field

The present invention relates to an automobile interior trim having a resin core material and a skin material that is joined on a surface of the resin core material. In particular, the automobile interior trim of the present invention is suitable for reducing a number of parts and manufacturing processes of the whole automobile interior trim and is also suitable for full automation of a manufacturing line of the automobile interior trim.

2. Description of the Background

A conventionally known automobile interior trim of the above type includes, for example, a door trim, in which a skin material is joined on a surface of a resin core material. The automobile interior trim having such a structure is fitted to a body panel of an automobile so that the skin material side will be disposed on an interior side of the automobile as a designed surface.

Such a conventional automobile interior trim, of which the skin material side is to be disposed on an interior side of an automobile as a designed surface, may have stitches that are formed on the skin material, from the point of view of improvement in appearance viewed from the interior side of the automobile and other purposes. One example is disclosed in Japanese Utility Model Registration No. 3184807. The stitches are formed on the skin material by sewing the skin material with threads.

A process for manufacturing a conventional automobile interior trim by using the skin material having stitches, for example, a door trim, includes a joining process and a cutting process. The joining process involves joining the skin material on a surface of a resin core material. The cutting process involves cutting an unnecessary part of a door trim base material having the resin core material and the skin material, which are joined together. The cutting process is generally called a trimming process.

FIG. 3A is a plan view of a skin material to be used for manufacturing a conventional automobile interior trim before the skin material is joined onto a resin core material. FIG. 3B is a sectional view of the skin material, which is cut along stitches shown in FIG. 3A for convenience of explanation. FIG. 3C is a schematic view of a cut section of the skin material and the stitches, which are cut by trimming in a manufacturing process of the conventional automobile interior trim.

A skin material 3 with stitches 4, which is used for manufacturing a conventional automobile interior trim, is cut by the trimming. Thus, threads 4A and 4B forming the stitches 4 are cut at parts between ends as shown in FIG. 3C and are thereby easily loosened. For this reason, the cut ends of the threads 4A and 4B are fixed with a tape T as shown in FIGS. 3A and 3B after the trimming.

The stitches 4 shown in FIG. 3A are formed by sewing using a sewing machine, and the threads 4A and 4B on upper and lower sides, which are needle thread and bobbin thread, engage with each other approximately in the middle of the thickness direction of the skin material 3 as shown in FIG. 3B. Thus, in the fixing work using the tape T, the thread 4A on the upper side is selected between the threads 4A and 4B on the upper and lower sides, which are cut by the trimming as shown in FIG. 3C, the selected thread 4A is manually pulled to the back surface side of the skin material 3, and then both the threads 4A and 4B are fixed with the tape T on one position of the back surface of the skin material 3.

As described above, in the conventional automobile interior trim, the ends of the threads 4A and 4B, which are cut by the trimming, are fixed with the tape T. This taping method has the following problems. That is, the tape T is necessary as a component of the automobile interior trim, which undesirably increases a number of parts of the whole automobile interior trim. The manual pulling work of the thread 4A and the fixing work using the tape T should be performed, which also undesirably increases manufacturing processes of the whole automobile interior trim. Moreover, it is difficult to fully automate a manufacturing line of such type of automobile interior trim.

BRIEF SUMMARY

The present invention has been achieved to solve the above problems, and an object of the present invention is to provide an automobile interior trim and a manufacturing method therefor, which are suitable for reducing a number of parts and manufacturing processes of the whole automobile interior trim and are also suitable for full automation of a manufacturing line of the automobile interior trim.

To achieve the above object, an aspect of the present invention provides an automobile interior trim having a resin core material and a skin material that is joined on a surface of the resin core material. The automobile interior trim includes stitches that are formed on the skin material by sewing the skin material with threads. The resin core material, the skin material, and the stitches are cut by a laser beam to generate a cut section, and a vicinity of the cut section has a structure in which the threads of the stitches and a raw material of the skin material are melted by heat of the laser beam, mixed together, and solidified.

The structure of the automobile interior trim of the present invention may be obtained by satisfying the following conditions.

Another aspect of the present invention provides a method for manufacturing an automobile interior trim having a resin core material and a skin material that is joined on a surface of the resin core material. The skin material has stitches that are formed by sewing the skin material with threads. The method includes cutting the resin core material, the skin material, and the stitches by using a laser beam, to generate a cut section. A vicinity of the cut section has a structure in which the threads of the stitches and a raw material of the skin material are melted by heat of the laser beam, mixed together, and solidified.

The structure in the method for manufacturing the automobile interior trim of the present invention may be obtained by satisfying the following conditions.

<<Conditions>>

Structure of the resin core material: a laminated structure of a polyethylene terephthalate (PET) nonwoven fabric, a glass-fiber-reinforced polypropylene (PP) resin sheet, and one of a polyamide (PA) film, a PP film, a PET film, and a polyethylene (PE) film.

Structure of the skin material: a laminated structure of a PET nonwoven fabric, a urethane layer, and one of a PET skin, a urethane skin, and a polyvinyl chloride (PVC) skin.

Material of the threads: PET or PA

Cutting speed of the laser beam: 30 to 30000 mm/min

Distance from a laser cutting nozzle that emits the laser beam, to a target to be cut by the laser beam: 0.5 to 5 mm Output of the laser beam: 300 to 2000 W Pressure of assist gas used in cutting with the laser beam: 0.1 to 4 kgf In the present invention using the above-described structure, the skin material and the stitches are cut by the laser beam to generate the cut section. The vicinity of the cut section has the structure in which the threads of the stitches and the raw material of the skin material are melted by heat of the laser beam, mixed together, and solidified. The structure stably fixes the ends of the threads that are cut by the laser beam. Thus, it is not necessary to perform a post-process of trimming, which is performed by means of cutting with a laser beam. For example, a manual pulling work of the thread and a fixing work using a tape are not necessary, unlike a conventional process. It is possible to dispense with these works. Accordingly, the present invention provides an automobile interior trim and a manufacturing method therefor, which are suitable for reducing a number of parts and manufacturing processes of the whole automobile interior trim and are also suitable for full automation of a manufacturing line of the automobile interior trim.

DETAILED DESCRIPTION

Hereinafter, an example of an embodiment of the present invention will be described in detail with reference to the attached drawings.

Figure 1A:
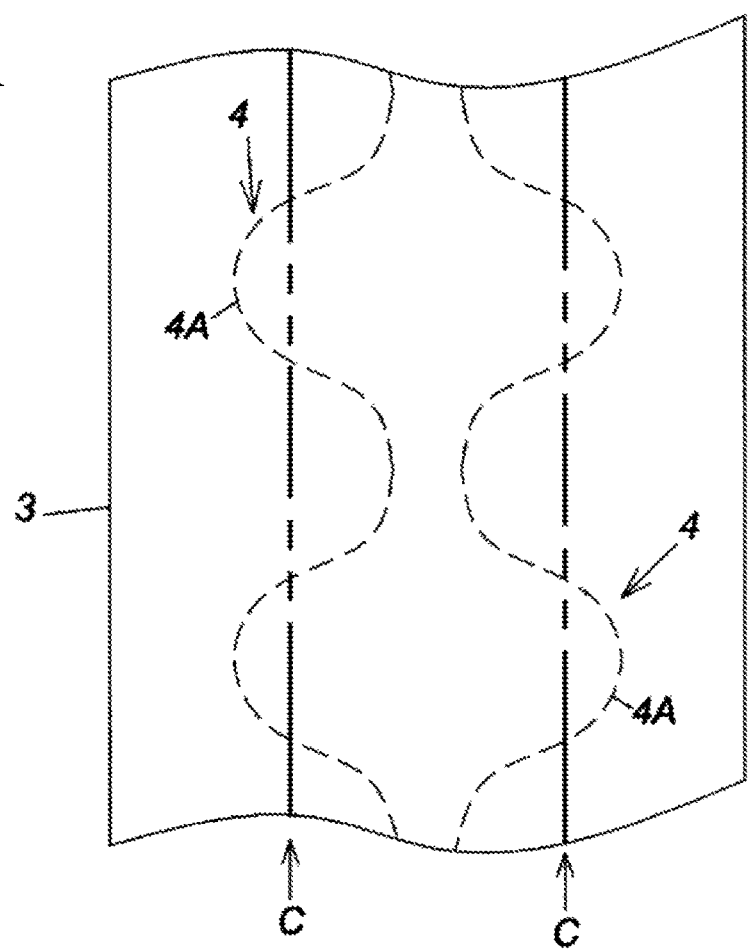
FIG. 1A is a plan view of a skin material to be used for manufacturing an automobile interior trim using the present invention, before the skin material is joined onto a resin core material.
Figure 1B:
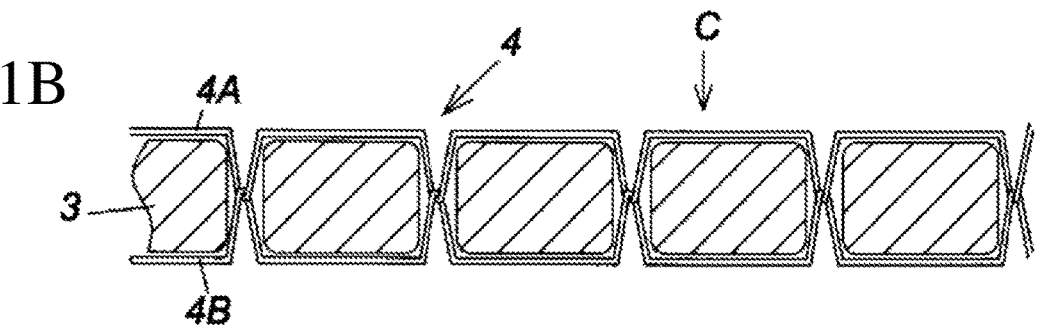
FIG. 1B is a schematic view of a cut section of the skin material, which is cut along stitches shown in FIG. 1A for convenience of explanation.
Figure 1C:
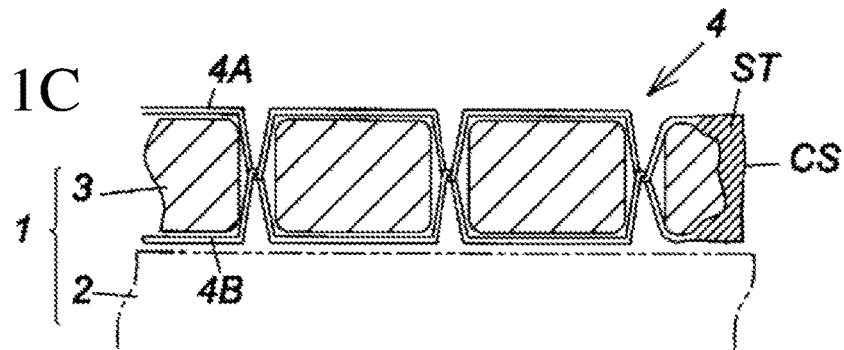
FIG. 1C is a schematic view of a cut section of the skin material and the stitches, which are cut along cut lines shown in FIG. 1A by a laser beam in a manufacturing process of the automobile interior trim.

FIG. 1A is a plan view of a skin material to be used for manufacturing an automobile interior trim using the present invention, before the skin material is joined onto a resin core material. FIG. 1B is a schematic view of a cut section of the skin material, which is cut along stitches shown in FIG. 1A for convenience of explanation. FIG. 1C is a schematic view of a cut section of the skin material and the stitches, which are cut along cut lines shown in FIG. 1A by a laser beam in a manufacturing process of the automobile interior trim.

FIG. 1C shows an automobile interior trim 1 of this embodiment. The automobile interior trim 1 has a resin core material 2 and a skin material 3 that is joined on a surface of the resin core material 2.

Figure 2:
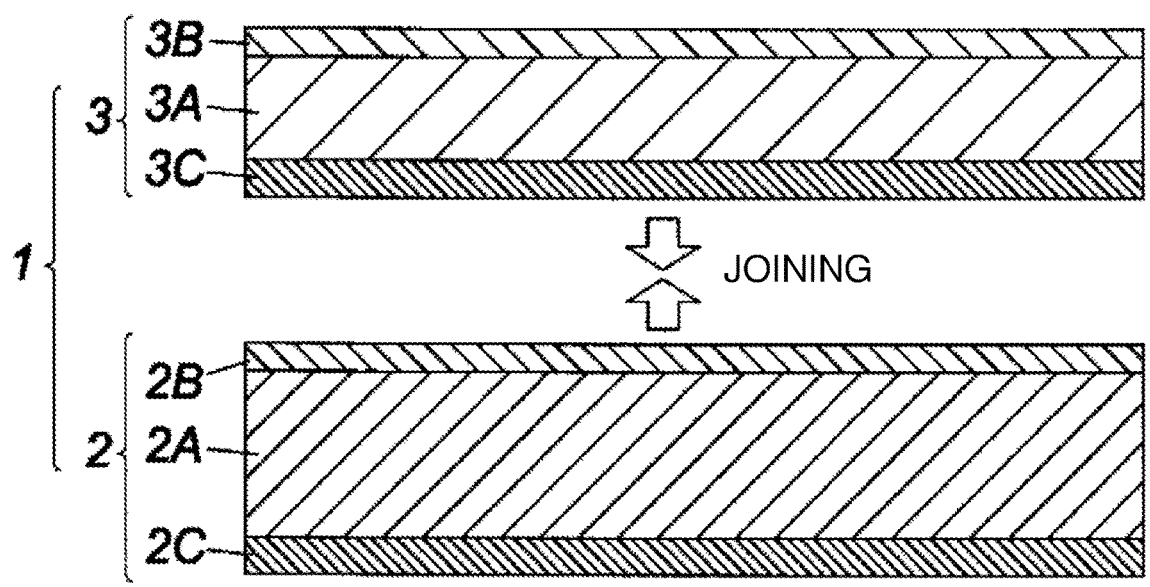
FIG. 2 is an exploded sectional view of the resin core material and the skin material before they are joined together.
Figure 3A:
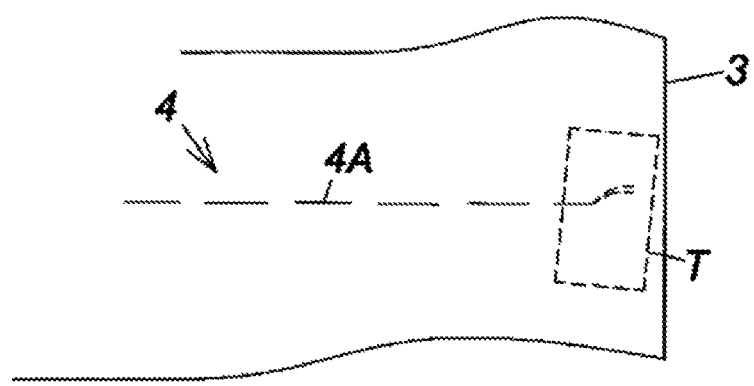
FIG. 3A is a plan view of a skin material to be used for manufacturing a conventional automobile interior trim before the skin material is joined onto a resin core material.
Figure 3B:
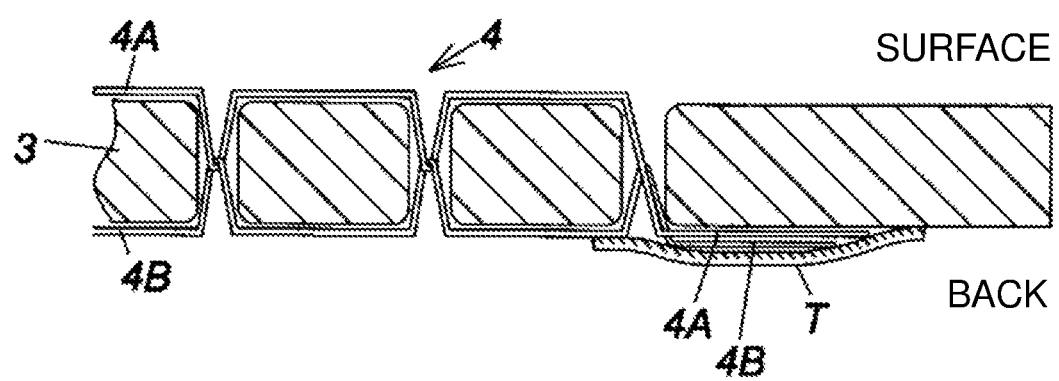
FIG. 3B is a sectional view of the skin material, which is cut along stitches shown in FIG. 3A for convenience of explanation.
Figure 3C:
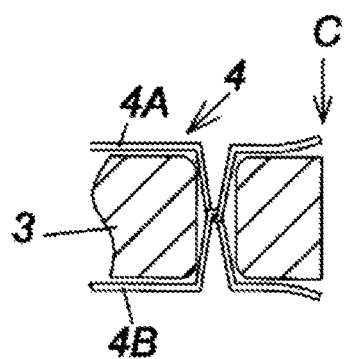
FIG. 3C is a schematic view of a cut section of the skin material and the stitches, which are cut along a cut line shown in FIG. 3A by trimming using an edged tool in a manufacturing process of the conventional automobile interior trim.

As shown in FIG. 2, the resin core material 2 before the joining has a base member 2A, a weldable film 2B that is attached on a surface side of the base member 2A, and a joining surface forming member 2C that is attached on a back surface of the base member 2A. Specifically, the base member 2A is a glass-fiber-reinforced PP resin sheet, the weldable film 2B is a PA film, a PP film, a PET film, or a PE film, and the joining surface forming member 2C is a PET nonwoven fabric. That is, the resin core material 2 has a laminated structure of a PET nonwoven fabric, a glass-fiber-reinforced PP resin sheet, and one of a PA film, a PP film, a PET film, and a PE film.

The skin material 3 before the joining has a cushion member 3A, a decorative member 3B that is attached on a surface of the cushion member 3A, and a joining surface forming member 3C that is attached on a back surface of the cushion member 3A. Specifically, the cushion member 3A is a urethane layer, the decorative member 3B is a PET skin, a urethane skin, or a PVC skin, and the joining surface forming member 3C is a PET nonwoven fabric. That is, the skin material 3 has a laminated structure of a PET nonwoven fabric, a urethane layer, and one of a PET skin, a urethane skin, and a PVC skin.

The resin core material 2 and the skin material 3 are joined together as follows. The skin material 3 and the resin core material 2 are laminated so that the PET nonwoven fabric 3C of the skin material 3 will be brought into contact with the weldable film 2B of the resin core material 2. The laminate of the skin material 3 and the resin core material 2 is pressurized and is heated at a predetermined pressure and at a predetermined temperature to melt the weldable film 2B of the resin core material 2. The melted weldable film 2B infiltrates into meshes of the PET nonwoven fabric 3C of the skin material 3 and solidifies.

The automobile interior trim 1 of this embodiment has stitches 4 that are formed on the skin material 3 by sewing the skin material 3 with threads 4A and 4B, as shown in FIG. 1C. The resin core material 2, the skin material 3, and the stitches 4 are cut along cut lines C by a laser beam to generate a cut section CS. A specific example of this condition is shown in a right end of the skin material 3 in FIG. 1C. The vicinity of the cut section CS has a structure ST in which the threads 4A and 4B of the stitches 4 and the raw material of the skin material 3, which is a thermoplastic resin as described above, are melted by heat of the laser beam, mixed together, and solidified.

The structure ST was obtained by satisfying the following conditions.

<<Conditions>>

Structure of the resin core material: a laminated structure of a PET nonwoven fabric, a glass-fiber-reinforced PP resin sheet, and one of a PA film, a PP film, a PET film, and a PE film.

Structure of the skin material: a laminated structure of a PET nonwoven fabric, a urethane layer, and one of a PET skin, a urethane skin, and a PVC skin.

Material of the threads: PET or PA

Cutting speed of the laser beam: 30 to 30000 mm/min

Distance from a laser cutting nozzle that emits the laser beam, to a target to be cut by the laser beam: 0.5 to 5 mm Output of the laser beam: 300 to 2000 W Pressure of assist gas used in cutting with the laser beam: 0.1 to 4 kgf The lower limit of the output of the laser beam is 300 W, as described above. Under the conditions that the cutting speed of the laser beam, the thickness of the skin material, and the thicknesses of the threads are set as described above, if the lower limit of the output is smaller than the set value, it is difficult to cut the resin core material 2, the skin material 3, and the threads 4A and 4B together at the part of the stitches 4, and therefore, a cutting failure easily occurs.

The upper limit of the output of the laser beam is 2000 W, as described above. Under the conditions that the cutting speed of the laser beam, the thickness of the skin material, and the thicknesses of the threads are set as described above, if the upper limit of the output is greater than the set value, an undesirable phenomenon such as burning tends to occur.

The lower limit of the cutting speed of the laser beam is 30 mm/min, as described above. Under the conditions that the output of the laser beam, the thickness of the skin material, and the thicknesses of the threads are set as described above, if the lower limit of the cutting speed is smaller than the set value, an undesirable phenomenon such as burning tends to occur.

The upper limit of the cutting speed of the laser beam is 30000 mm/min, as described above. Under the conditions that the output of the laser beam, the thickness of the skin material, and the thicknesses of the threads are set as described above, if the upper limit of the cutting speed is greater than the set value, it is difficult to cut the resin core material 2, the skin material 3, and the threads 4A and 4B together at the part of the stitches 4, and therefore, a cutting failure easily occurs.

The stitches 4 are formed on the skin material 3 by sewing using a sewing machine, in the automobile interior trim 1 of this embodiment. Thus, the stitches 4 that are formed on the skin material 3 have the threads 4A and 4B on the upper and lower sides, which are the needle thread and the bobbin thread, and the threads 4A and 4B engage with each other approximately in the middle of the thickness direction of the skin material 3. However, the stitches 4 are not limited to this structure.

The raw material of the resin core material 2 can be any material that is suitable for joining to the skin material 3 and is appropriately selected from among these suitable materials in accordance with requirement. On the other hand, the raw material of the skin material 3 and the raw materials of the threads 4A and 4B of the stitches 4 are limited to materials that provide the structure ST when being cut by the laser beam.

The automobile interior trim 1 of this embodiment having the above-described structure is manufactured by the following processes 1 and 2.

Process 1

The process 1 involves joining the skin material 3 and the resin core material 2 to each other. The joining is performed by pressurizing and heating the resin core material 2 and the skin material 3 in a condition in which they are laminated and are brought into contact with each other, to weld the surface of the resin core material 2 and the back surface of the skin material 3 together.

Process 2

The process 2 involves cutting an unnecessary part of a door trim base material having the resin core material 2 and the skin material 3, which are joined together in the process 1. That is, the process 2 involves the trimming and uses a laser beam for the cutting.

As shown in FIGS. 1A and 1B, the stitches 4 exist on the cut lines C to be cut by the laser beam. That is, the resin core material 2, the skin material 3, and the stitches 4 are cut by the laser beam in the process 2.

The cutting of the resin core material 2, the skin material 3, and the stitches 4 by the laser beam is performed under the conditions that satisfy the above-described conditions. As a result, the cut section CS is generated by the laser beam. The vicinity of the cut section CS has the structure ST in which the threads 4A and 4B of the stitches 4 and the raw material of the skin material 3, which is a thermoplastic resin as described above, are melted by heat of the laser beam, mixed together, and solidified.

The automobile interior trim 1 of the above-described embodiment has the following structure, which is obtained by the manufacturing method of the automobile interior trim 1. That is, the skin material 3 and the stitches 4 are cut by the laser beam to generate the cut section CS. The vicinity of the cut section CS has the structure ST in which the threads 4A and 4B of the stitches 4 and the raw material of the skin material 3 are melted by heat of the laser beam, mixed together, and solidified. The structure ST stably fixes the ends of the threads 4A and 4B that are cut by the laser beam. Thus, it is not necessary to perform a post-process of trimming, which is performed by means of cutting with a laser beam. For example, a manual pulling work of the thread and a fixing work using a tape are not necessary, unlike a conventional process. It is possible to dispense with these works. Accordingly, the automobile interior trim 1 and the manufacturing method therefor are suitable for reducing a number of parts and manufacturing processes of the whole automobile interior trim and are also suitable for full automation of a manufacturing line of the automobile interior trim.

The present invention is not limited to the embodiment described above, and the present invention can be variously modified by a person having ordinary skill in the art, within the technical concept of the present invention.

REFERENCE SIGNS LIST 1 automobile interior trim
2 resin core material
3 skin material
4 stitches
4A, 4B thread
C cut line
CS cut section generated by a laser beam
ST structure
T nonwoven fabric tape

The invention claimed is:

1. A method of manufacturing an automobile interior trim comprising:
   cutting a skin material having stitches that are formed of threads, by a laser beam, to generate a cut section and to melt the threads and a raw material of the skin material in a vicinity of the cut section by heat of the laser beam; and pressurizing and heating the skin material and a resin core material to join the skin material and the resin core material together.

2. The method of manufacturing the automobile interior trim according to claim 1, further comprising:
laminating a first joining surface forming member, a base member, and a weldable film to form the resin core material; and
laminating a second joining surface forming member, a cushion member, and a decorative member to form the skin material.

3. The method of manufacturing the automobile interior trim according to claim 2, wherein
the first joining surface forming member is made of a PET nonwoven fabric,
the base member is made of a glass-fiber-reinforced PP resin sheet, and
the weldable film is made of a PA film, a PP film, a PET film, or a PE film.

4. The method of manufacturing the automobile interior trim according to claim 2, wherein
the second joining surface forming member is made of a PET nonwoven fabric,
the cushion member is made of a urethane layer, and
the decorative member is made of a PET skin, a urethane skin, or a PVC skin.

5. The method of manufacturing the automobile interior trim according to claim 3, wherein
the second joining surface forming member is made of a PET nonwoven fabric,
the cushion member is made of a urethane layer, and
the decorative member is made of a PET skin, a urethane skin, or a PVC skin.

6. The method of manufacturing the automobile interior trim according to claim 1, wherein the threads are made of PET or PA.

7. The method of manufacturing the automobile interior trim according to claim 5, wherein the threads are made of PET or PA.

8. The method of manufacturing the automobile interior trim according to claim 1, wherein the cutting is performed by emitting the laser beam with an output power of 300 to 2000 W at a position 0.5 to 5 mm separated from the skin material and the resin core material, which are joined together, to cut the skin material and the resin core material at a cutting speed of 30 to 30000 mm/min.

9. The method of manufacturing the automobile interior trim according to claim 7, wherein the cutting is performed by emitting the laser beam with an output power of 300 to 2000 W at a position 0.5 to 5 mm separated from the skin material and the resin core material, which are joined together, to cut the skin material and the resin core material at a cutting speed of 30 to 30000 mm/min.

10. The method of manufacturing the automobile interior trim according to claim 8, wherein the cutting with the laser beam is performed under a pressure of 0.1 to 4 kgf of assist gas.

11. An automobile interior trim comprising:
a resin core material; and
a skin material having stitches that are formed of threads, the skin material joined onto the resin core material and having a cut section and an end in a vicinity of the cut section, and the end having the threads and a raw material of the skin material that are melted and are solidified.

12. The automobile interior trim according to claim 11, wherein
the resin core material includes
a first joining surface forming member,
a weldable film, and
a base member that is held between the first joining surface forming member and the weldable film,
the skin material includes
a second joining surface forming member,
a decorative member, and
a cushion member that is held between the second joining surface forming member and the decorative member, and
the weldable film and the second joining surface forming member are joined together.

13. The automobile interior trim according to claim 12, wherein
the first joining surface forming member is made of a PET nonwoven fabric,
the base member is made of a glass-fiber-reinforced PP resin sheet, and
the weldable film is made of a PA film, a PP film, a PET film, or a PE film.

14. The automobile interior trim according to claim 12, wherein
the second joining surface forming member is made of a PET nonwoven fabric,
the cushion member is made of a urethane layer, and
the decorative member is made of a PET skin, a urethane skin, or a PVC skin.

15. The automobile interior trim according to claim 13, wherein
the second joining surface forming member is made of a PET nonwoven fabric,
the cushion member is made of a urethane layer, and
the decorative member is made of a PET skin, a urethane skin, or a PVC skin.

16. The automobile interior trim according to claim 11, wherein the threads are made of PET or PA.

17. The automobile interior trim according to claim 15, wherein the threads are made of PET or PA.

* * * * *